(12) United States Patent
Kurabayashi et al.

(10) Patent No.: US 9,348,808 B2
(45) Date of Patent: May 24, 2016

(54) CONTENT-BASED AUTOMATIC INPUT PROTOCOL SELECTION

(75) Inventors: Shuichi Kurabayashi, Fujisawa (JP); Naofumi Yoshida, Yokohama (JP); Kosuke Takano, Fujisawa (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 500 days.

(21) Appl. No.: 13/519,308

(22) PCT Filed: Dec. 12, 2011

(86) PCT No.: PCT/US2011/064453
§ 371 (c)(1),
(2), (4) Date: Jun. 26, 2012

(87) PCT Pub. No.: WO2013/089668
PCT Pub. Date: Jun. 20, 2013

(65) Prior Publication Data
US 2013/0151508 A1    Jun. 13, 2013

(51) Int. Cl.
  *G06F 7/00* (2006.01)
  *G06F 17/27* (2006.01)
  *G06F 17/22* (2006.01)

(52) U.S. Cl.
  CPC .......... *G06F 17/276* (2013.01); *G06F 17/2223* (2013.01); *G06F 17/275* (2013.01)

(58) Field of Classification Search
  None
  See application file for complete search history.

(56) References Cited

U.S. PATENT DOCUMENTS 5,210,689 A * 5/1993 Baker ................. G06F 3/0489
                                                      341/22
5,689,584 A * 11/1997 Kobayashi ........... G06K 9/4647
                                                      382/190

(Continued)

FOREIGN PATENT DOCUMENTS

| JP | 2007-034871 A | 2/2007 |
| JP | 2007-034871 | 8/2007 |
| WO | 2011/047057 A1 | 4/2011 |

OTHER PUBLICATIONS

International Search Report and Written Opinion of the International Searching Authority dated Apr. 10, 2012 as received in application No. PCT/US2011/064453.
"Language-detection," accessed at http://web.archive.org/web/20111201223439/http://code.google.com/p/language-detection, accessed on Nov. 10, 2014, pp. 1-2.

(Continued)

*Primary Examiner* — Jay Morrison
*Assistant Examiner* — Hasanul Mobin
(74) *Attorney, Agent, or Firm* — Maschoff Brennan

(57) ABSTRACT

Technologies for selecting an input protocol based on an input content are generally disclosed. In one example, a method for selecting an input protocol based on an input content can include: acquiring the input content; analyzing the input content; extracting one or more indivisible individual units from the input content; calculating a similarity between a first frequency of occurrence of the one or more indivisible individual units and a second frequency of occurrence of the one or more indivisible individual units, wherein the second frequency of occurrence of the one or more indivisible individual units is predetermined with a second value of frequency of occurrence; ranking the similarity; identifying the input protocol based on the similarity; and selecting a first ranked input protocol having a highest similarity.

19 Claims, 10 Drawing Sheets

(56) References Cited

U.S. PATENT DOCUMENTS

| | | | |
|---|---|---|---|
| 7,966,185 B2* | 6/2011 | Eide | G10L 13/10 704/258 |
| 2002/0178141 A1* | 11/2002 | Kushnirskiy | G06F 9/465 |
| 2004/0002973 A1* | 1/2004 | Chaudhuri et al. | 707/7 |
| 2006/0112162 A1* | 5/2006 | Marot et al. | 709/203 |
| 2007/0124132 A1 | 5/2007 | Takeuchi | |
| 2008/0270110 A1* | 10/2008 | Yurick | G06F 17/30026 704/3 |
| 2009/0083028 A1* | 3/2009 | Davtchev | G06F 17/273 704/9 |
| 2009/0306969 A1* | 12/2009 | Goud | G06F 17/276 704/10 |
| 2010/0076749 A1* | 3/2010 | Osada et al. | 704/9 |
| 2010/0257202 A1* | 10/2010 | Szummer | G06F 17/30705 707/771 |
| 2010/0318423 A1 | 12/2010 | Kanigsberg et al. | |
| 2011/0037718 A1 | 2/2011 | Stephanick et al. | |
| 2011/0043701 A1* | 2/2011 | Kurita et al. | 348/578 |
| 2011/0087962 A1 | 4/2011 | Paddon | |
| 2011/0105190 A1 | 5/2011 | Cha et al. | |
| 2011/0106807 A1* | 5/2011 | Srihari et al. | 707/739 |

OTHER PUBLICATIONS

"Rosette Base Linguistics," accessed at http://www.basistech.com/text-analytics/rosette/base-linguistics/, accessed on Nov. 10, 2014, pp. 1-5.

"Rosette Language Identifier," accessed at http://www.basistech.com/text-analytics/rosette/language-identifier/, accessed on Nov. 10, 2014, pp. 1-4.

Asahara, M., and Matsumoto, Y., "Japanese Named Entity Extraction with Redundant Morphological Analysis," Proceedings of HLT-NAACL, vol. 1, pp. 8-15 (2003).

Toutanova, K., and Manning, C. D., "Enriching the Knowledge Sources Used in a Maximum Entropy Part-of-Speech Tagger," Proceedings of the 2000 Joint SIGDAT conference on Empirical methods in natural language processing and very large corpora: held in conjunction with the 38th Annual Meeting of the Association for Computational Linguistics, vol. 13, pp. 63-70 (2000).

Toutanova, K., et al., "Feature—Rich Part-of-Speech Tagging with a Cyclic Dependency Network," Proceedings of HLT-NAACL, vol. 1, pp. 173-180 (2003).

* cited by examiner

CONTENT-BASED AUTOMATIC INPUT PROTOCOL SELECTION

BACKGROUND

Unless otherwise indicated herein, the materials described herein are not prior art to the claims in the present application and are not admitted to be prior art by inclusion in this section.

At present, mobile devices enable a user to input content for various purposes, such as to generate messages, to take notes for classes, or to create business records. The input content may include plain language text, punctuation, symbols (e.g., small images or animation icons), emoticons, or the combination thereof. To input a certain type of content, a user may have to switch from a current input protocol to a suitable input protocol depending on the recipient or the type of content. For example, after a user prepares a message for a Chinese-speaking person on-line and before preparing a message to a Japanese-speaking person, the user may have to switch from a Chinese language generating protocol to a Japanese language generating protocol, especially if the next person is Japanese-speaking only. In addition, in order to make the input content compact or to add some emotional characteristics, a user may have to switch input protocols several times to input special symbols or emoticons. Frequent input protocol switching can sometimes be stressful and can cause inconveniences when using a mobile device, such as a portable computer, smart phone, a tablet, or the like.

SUMMARY

Techniques described herein generally relate to automatically selecting an input protocol, which may include a generating protocol and a prediction dictionary protocol, based on an input content.

In one embodiment, a method for selecting an input protocol based on an input content may include: acquiring the input content; analyzing the input content; extracting one or more indivisible individual units from the input content; calculating a similarity between a first frequency of occurrence of the one or more indivisible individual units and a second frequency of occurrence of the one or more indivisible individual units, wherein the second frequency of occurrence of the one or more indivisible individual units is predetermined with a second value of frequency of occurrence; ranking the similarity; identifying one or more input protocols based on the similarity; and selecting a first ranked input protocol having a highest similarity.

In one embodiment, a system for selecting an input protocol based on an input content may include: a processing module configured to acquire the input content, analyze the input content, and extract one or more indivisible individual units from the input content; a calculating module configured to calculate a similarity between a first frequency of occurrence of the one or more indivisible individual units and a second frequency of occurrence of the one or more indivisible individual units, wherein the second frequency of occurrence of the one or more indivisible individual units is predetermined with a second value of frequency of occurrence; a selecting module configured to rank the similarity, identify one or more input protocols based on the similarity, and select a first ranked input protocol having a highest similarity; and one or more user interfaces (UI) configured to receive the input content, and suggest the first ranked input protocol. The UI can include a graphical user interface (GUI) to provide visual information to a user, or the UI can include a keyboard, mouse, touch screen or other UI device to receive the input content from a user. A GUI can suggest the first ranked input protocol to the user, such as by displaying information regarding the first ranked input protocol on a display screen.

In one embodiment, a device for selecting an input protocol based on an input content may include: a processing unit configured to acquire the input content, analyze the input content, and extract one or more indivisible individual units from the input content; a calculating unit configured to calculate a similarity between a first frequency of occurrence of the one or more indivisible individual units and a second frequency of occurrence of the one or more indivisible individual units, wherein the second frequency of occurrence of the one or more indivisible individual units is predetermined with a second value of frequency of occurrence; a selecting unit configured to rank the similarity, identify one or more input protocols based on the similarity, and select a first ranked input protocol having a highest similarity; and one or more user interfaces (UI) configured to receive the input content, and suggest the first ranked input protocol. The UI can include a graphical user interface (GUI) to provide visual information to a user as well as a keyboard, mouse, touch screen or other UI to receive the input content and suggest the first ranked input protocol.

In one embodiment, a computer-readable storage medium can be provided that includes computer-readable instructions stored thereon that are executable by a computing device to perform operations, wherein the computer-readable storage medium is configured to select an input protocol based on an input content. The input content can be input into the computing device through a UI. The operation of the computing device having the storage medium with computer-readable instructions can include: acquiring the input content; analyzing the input content; extracting one or more indivisible individual units from the input content; calculating a similarity between a first frequency of occurrence of the one or more indivisible individual units and a second frequency of occurrence of the one or more indivisible individual units, wherein the second frequency of occurrence of the one or more indivisible individual units is predetermined with a second value of frequency of occurrence; ranking the similarity; identifying one or more input protocols based on the similarity; and selecting a first ranked input protocol having a highest similarity.

In one embodiment, a method for selecting an input protocol based on an input content may include: analyzing the input content; calculating a similarity between the input content and a database; ranking the similarity; identifying one or more input protocols based on the similarity; and selecting a first ranked input protocol having a highest similarity.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and following information as well as other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

Figure 1A:
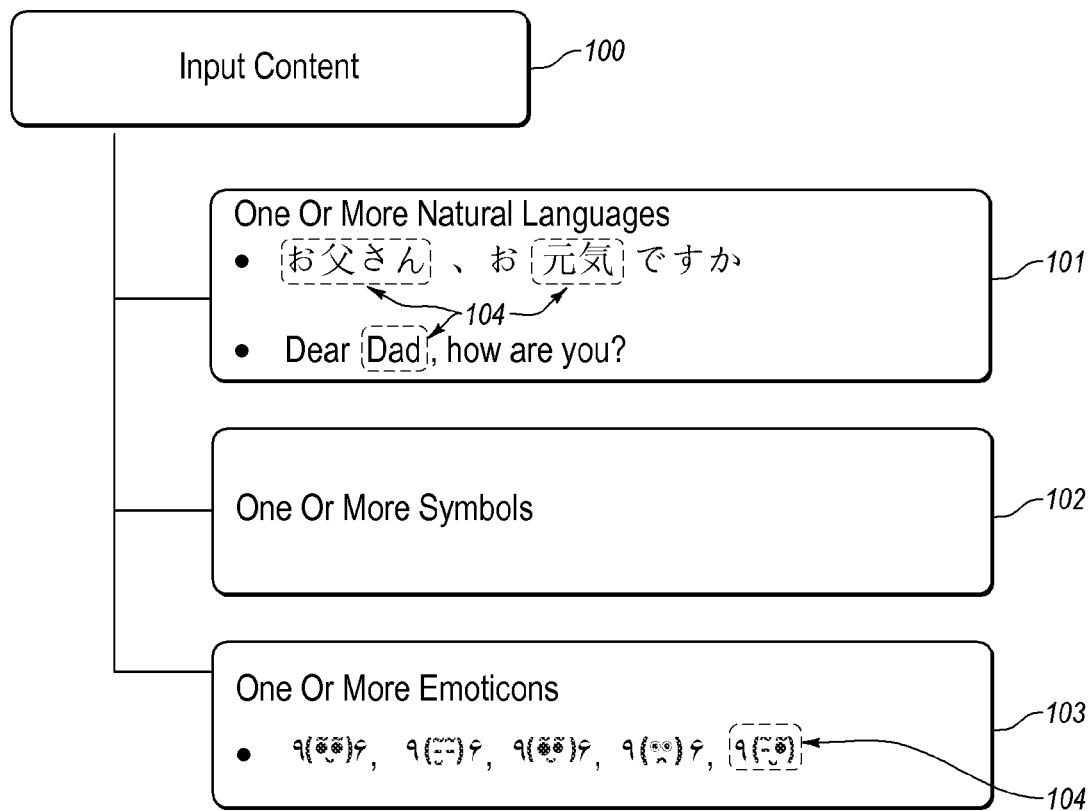
FIG. 1A illustrates an example of an input content including one or more natural languages, one or more symbols, and one or more emoticons.

all arranged in accordance with at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Generally, the present disclosure relates to devices, systems, and method for inputting content into a computing device. Such inputting can be facilitated by the device receiving text input from a user, and then processing and analyzing the text in order to generate and provide predicted text to the user. The device can include hardware and software that can analyze the text and predict the text that may be input by the user. The device can use past text input by the user as well as a topic of the text or an intended recipient of the text in order to make a prediction of text that will be input by the user.

The following example provides an embodiment of devices, systems, and methods described herein. When a user inputs information into a computing device to prepare text, the user may need to type each and every character, word, sentence, symbol, punctuation mark, or emoticon of the input content of the text. However, computing devices can be configured with hardware and software to provide a user with recommended input content, such as text, symbols, or emoticons based on the input content that is input into the computing device by the user.

In one embodiment, a computing device can provide recommended input content using one or more input protocols based on the input content provided by the user. The one or more input protocols can each include a generating protocol that generates input content (e.g., generated content) and a prediction dictionary protocol that predicts input content (e.g., predicted content).

In one embodiment, the generating protocol may be used (e.g., by the user) in order to generate, input and edit natural languages, symbols and emoticons, which are included in generated input that is provided to the user as a generated input content. In one embodiment, the prediction dictionary protocol may be used to facilitate prediction of the predicted content that can be used for the input content of the text based on the input content provided by the user. In one embodiment, the generating protocol and prediction dictionary protocol can cooperate in order to provide recommended input content to the user, where the recommended input content can include generated content and predicted content.

In one embodiment, the generating protocol can be used to generate content based on what is actually input into the device by the user. That is, the generating protocol receives input from the user and generates content that is displayed or otherwise provided to the user. The generating protocol can provide generated content that is exactly as input by the user or the generated content can arise from the input, such as be combining or separating characters of the input from the user in order to generate input content (e.g., generated content) that is provided to the user. For example, the generating protocol can generate a "smiley face" from a colon and closing parenthesis (e.g., ":)").

In one embodiment, the prediction dictionary protocol may include a database of words, sentences, symbols or emoticons frequently used or featured in a topic domain or a relationship that is relevant to the input content. In one embodiment, a topic domain can include a type of topic relevant to the contextual environment of the input content, where examples of different topic domains can include business, school, athletics, activity, calendar, or other types of contextual environments. In another embodiment, the relationship can generally refer to the type of interpersonal connection between a person (e.g., user) creating the text of the input content and an intended receiver of the text of the input content. Some examples of relationships can be business contacts, school contacts, athletic contacts, activity contacts, acquaintances, friends, family, or significant others such as spouses, girlfriends and boyfriends.

In one embodiment, the generating protocol may cooperate with the corresponding prediction dictionary protocol to facilitate generation and prediction of the input content. The prediction and/or generation of the recommended input content can be based on the topic domain and the relationship parameters relevant to the input content provided by the user. For example, a business prediction dictionary protocol may include a database of words, sentences, symbols or emoticons frequently used in a business related topic domain. When a user uses the generating protocol to generate, input, and edit business related input content, the business prediction dictionary protocol can be used to predict certain input content, such as words or sentences frequently used in the business topic domain.

In one embodiment, the prediction may be conducted through searching the database and suggesting the appropriate words or sentences to the user based on the input content provided by the user. In some instances, a user may have to switch the prediction dictionary protocol during creation of the input content. For example, when the user changes the input content recipient from a business partner to a family member, the user and/or computing device may have to switch a business prediction dictionary protocol to a family member prediction dictionary protocol. This facilitates preparing text by selecting appropriate text for the intended recipient of the text. Now, the switching of input protocols by the computing device can be automated based at least in part on the topic domain and the relationship with the systems and methods described herein.

FIG. 1A illustrates an example of an input content including one or more natural languages, one or more symbols, and one or more emoticons, arranged in accordance with at least some embodiments described herein. As illustrated in FIG. 1A, an input content 100 may include one or more natural languages 101, one or more symbols 102 or one or more emoticons 103, or any combination thereof. The input content 100 can include any combination of the one or more natural languages 101, the one or more symbols 102, or the one or more emoticons 103. For example, a person who speaks both Japanese and English might generate a message which includes both Japanese words and sentences and English words and sentences, where the one or more natural languages 101 includes Japanese and English. The one or more natural languages 101 can be any kind of human language, such as Japanese, Chinese, French, Spanish or English, or any combination thereof, as opposed to computer languages.

Figure 1B:
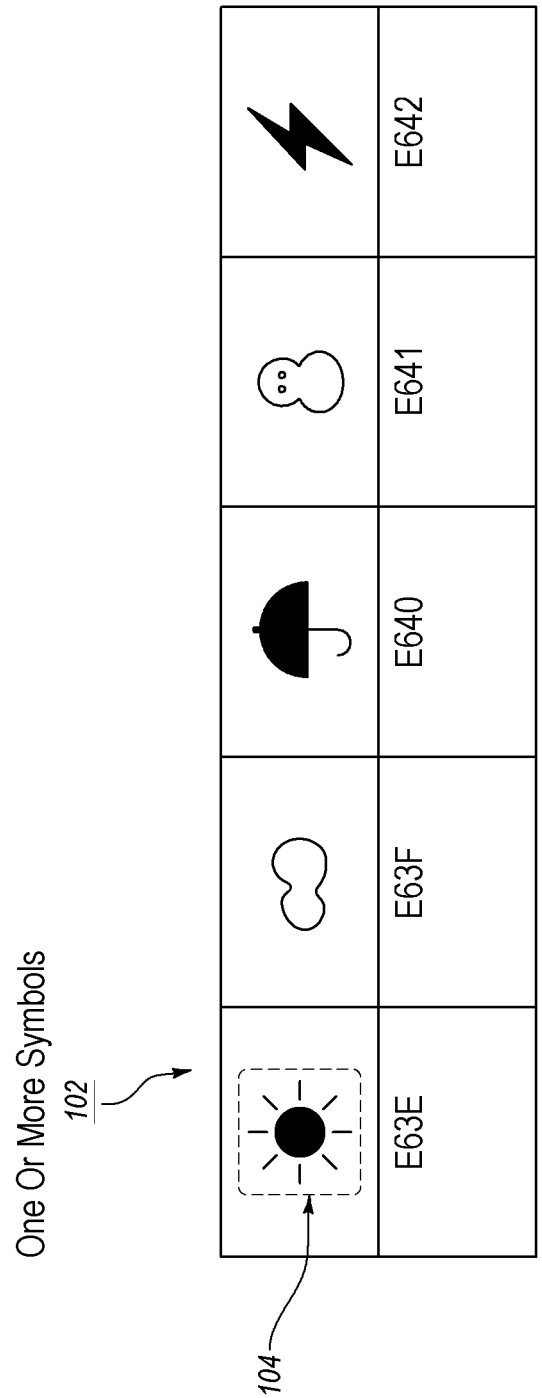
FIG. 1B illustrates examples of one or more symbols.

FIG. 1B illustrates examples of one or more symbols, arranged in accordance with at least some embodiments described herein. As illustrated in FIG. 1B, the one or more symbols 102 can be any symbol, including static small images or animation icons, with or without certain meanings. Usually, the content of the one or more symbols 102 can have some connotation of information to be provided. For example, a sun icon (E63E) can be used to represent sunny weather, a cloud icon (E63F) can be used to represent cloudy weather, an umbrella icon (E640) can be used to represent rainy weather, a snowman icon (E641) can be used to represent snowy weather, a lightening bold icon (E642) can be used to represent thunder and lightning weather, a flight icon (not shown) can be used to represent flight status, or a cake icon (not shown) can be used to represent a birthday. Referring again to FIG. 1A, the one or more emoticons 103 can be in any format, such as any facial expression pictorially represented by punctuation and letters. The one or more emoticons 103 can be used to express certain mood, such as a smile emoticon being used to express relaxing mood or a frown to be a bad mood.

The input content 100 may contain one or more indivisible individual units 104. The one or more indivisible individual units 104 can be in any format depending on the text or characters of the input content 100. When the input content 100 includes one or more natural languages 101, the one or more indivisible individual units 104 can be the smallest linguistic unit of that natural language, such as a letter or word, a punctuation mark or combination thereof. The words can be common dictionary words or slang for a particular natural language. The smallest linguistic unit is a linguistic unit that can carry certain meanings. The smallest linguistic unit can have different structures depending on different natural languages. For example, when the one or more natural languages 101 includes Japanese, the one or more indivisible individual units 104 can be a morphactin because in Japanese, a morphactin is used as the smallest linguistic unit with certain meanings. For instance, "Ohayou" is a morphactin in Japanese, which means "Good Morning." Any individual kana character in the morphactin of "Ohayou" such as "O" does not carry any meaning. Therefore, the morphactin of "Ohayou" can be treated as the smallest linguistic unit in Japanese, and thus can be included in the one or more indivisible individual units 104 when the one or more natural languages 101 includes Japanese. On the other hand, when the one or more natural languages 101 includes English, the one or more indivisible individual units 104 can be a single word because in English, a single word is enough to carry certain meanings, and in some instances a single letter or single punctuation mark can carry sufficient meaning. For example, the word "sunny" can be one of the one or more indivisible individual units 104 when the one or more natural languages 101 includes English. Also, a question mark (e.g., "?") that represents a question can be one of the one or more individual units 104. In some instances, single letters or numbers can be an indivisible individual unit or be part of the one or more indivisible individual units 104, especially in informal texts that use slang or phonetic slang to represent actual words. One or more symbols 102 can be used as the one or more indivisible individual units 104, such as a single small image or a single animation icon being a single indivisible individual unit. One or more emoticons 103 can be used as the one or more indivisible individual units 104, such that a single emoticon may be formed by one or more character inputs, such as letters, numbers, or punctuation or the like.

The one or more indivisible individual units 104 may be encoded by one of the computing industry standards. The computing industry standards may include UNICODE, ISO-2022-JP, ISO-2022-CN, ISO-2022-KR, EUC-JP, EUC-KR, EUC-CN, EUC-TW and Shift_JIS-2004. Therefore, any of the one or more indivisible individual units 104 of the input content 100 can be encoded, interpreted and identified with one specific code defined by one of the computing industry standards.

Figure 2A:
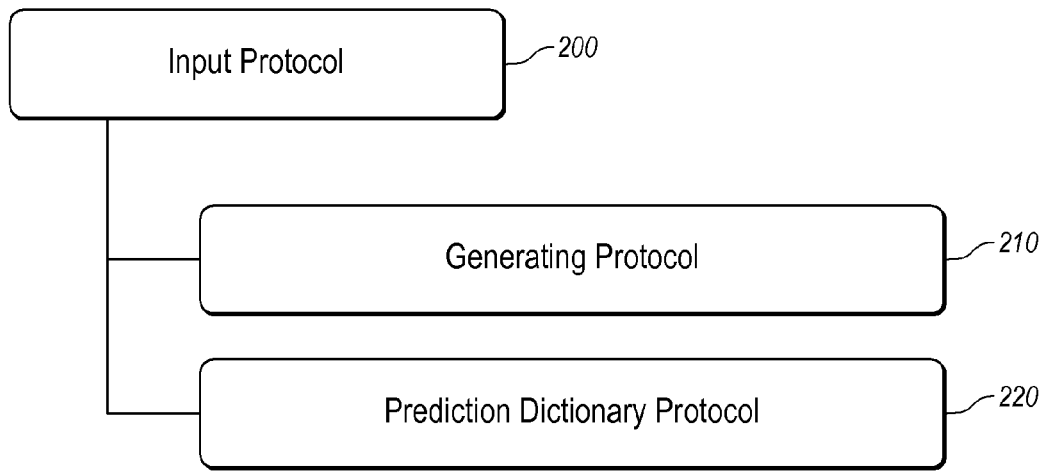
FIG. 2A illustrates an example of an input protocol including a generating protocol and a prediction dictionary protocol.
Figure 2B:
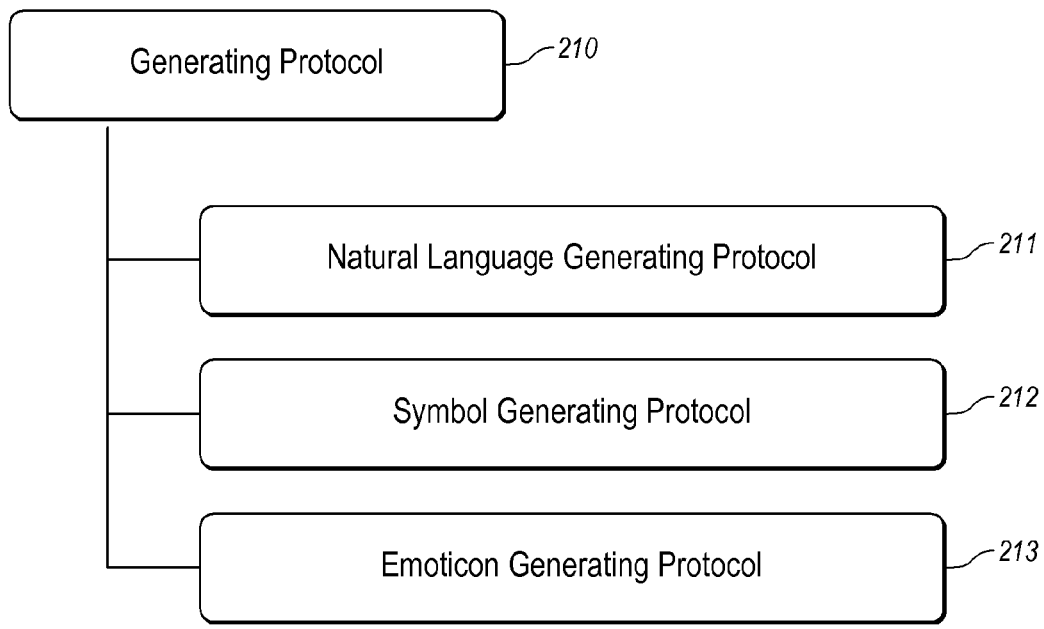
FIG. 2B illustrates an example of a generating protocol including a natural language generating protocol, a symbol generating protocol and an emoticon generating protocol.

FIG. 2A illustrates an example of an input protocol including a generating protocol and a prediction dictionary protocol arranged in accordance with at least some embodiments described herein. As illustrated in FIG. 2A, an input protocol 200 can include a generating protocol 210 and a prediction dictionary protocol. The input protocol 200 may be used to generate, input, and edit the input content 100. This can include the input protocol 200 generating, inputting, and editing the one or more natural languages 101, the one or more symbols 102 and the one or more emoticons 103. The generating protocol 210 may be used to generate, input and edit the one or more natural languages 101, the one or more symbols 102 and the one or more emoticons 103. As illustrated in FIG. 2B, the generating protocol 210 may include a natural language generating protocol 211, a symbol generating protocol 212, and an emoticon generating protocol 213. The natural language generating protocol 211 may be used to generate and input a character of the one or more natural languages 101, such as through the computing device selecting or determining an alphabet or a numeric character, a word, or a sentence for the one or more natural languages 101, based on a user inputting characters into the computing device, such as by using a keyboard or a touch screen of the computing device. The symbol generating protocol 212 may be used to generate and input the one or more symbols 102, such as through the computing device selecting or determining the one or more symbols 102 from a symbol list or inputting a code or combination of characters representing the one or more symbols 102. The emoticon generating protocol 213 may be used to generate and input the one or more emoticons 103, such as through the computing device selecting or determining the one or more emoticons 103 from an emoticon list or using several characters (e.g., punctuations or letters) to generate the one or more emoticons 103. The computing device can select or determine content to be generated and/or provided to the user by using one or more of the natural language generating protocol 211, symbol generating protocol 212, and emoticon generating protocol based on content input into the computing device by the user.

The generating protocol 210 can be switched among different types of the natural language generating protocol 211, such as from a Chinese language generating protocol to a Japanese language generating protocol. Also, the generating protocol 210 can be switched among different types of the symbol generating protocol 212, such as from a weather symbol generating protocol to a fashion symbol generating protocol. Additionally, the generating protocol 210 can also be switched among different types of the emoticon generating protocol 213, such as from a happy mood emoticon generating protocol to a sad mood emoticon generating protocol. In addition, the generating protocol 210 can be switched among different types of generating protocols, such as from the natural language generating protocol 211 to the symbol generating protocol 212, or from the symbol generating protocol 212 to the emoticon generating protocol 213. The generating protocol 210 switching process may depend on the input content 100 as well as on the topic domain and relationship parameters. For example, a user may want to insert one or more symbols 102 or one or more emoticons 103 in to a sentence generated with the one or more natural languages 101, and may therefore have to switch the generating protocol 210 several times during such inputting process.

As illustrated in FIG. 2A, the input protocol 200 may also include a prediction dictionary protocol 220. The prediction dictionary protocol 220 can be used to facilitate the prediction of the input content 100.

Figure 2C:
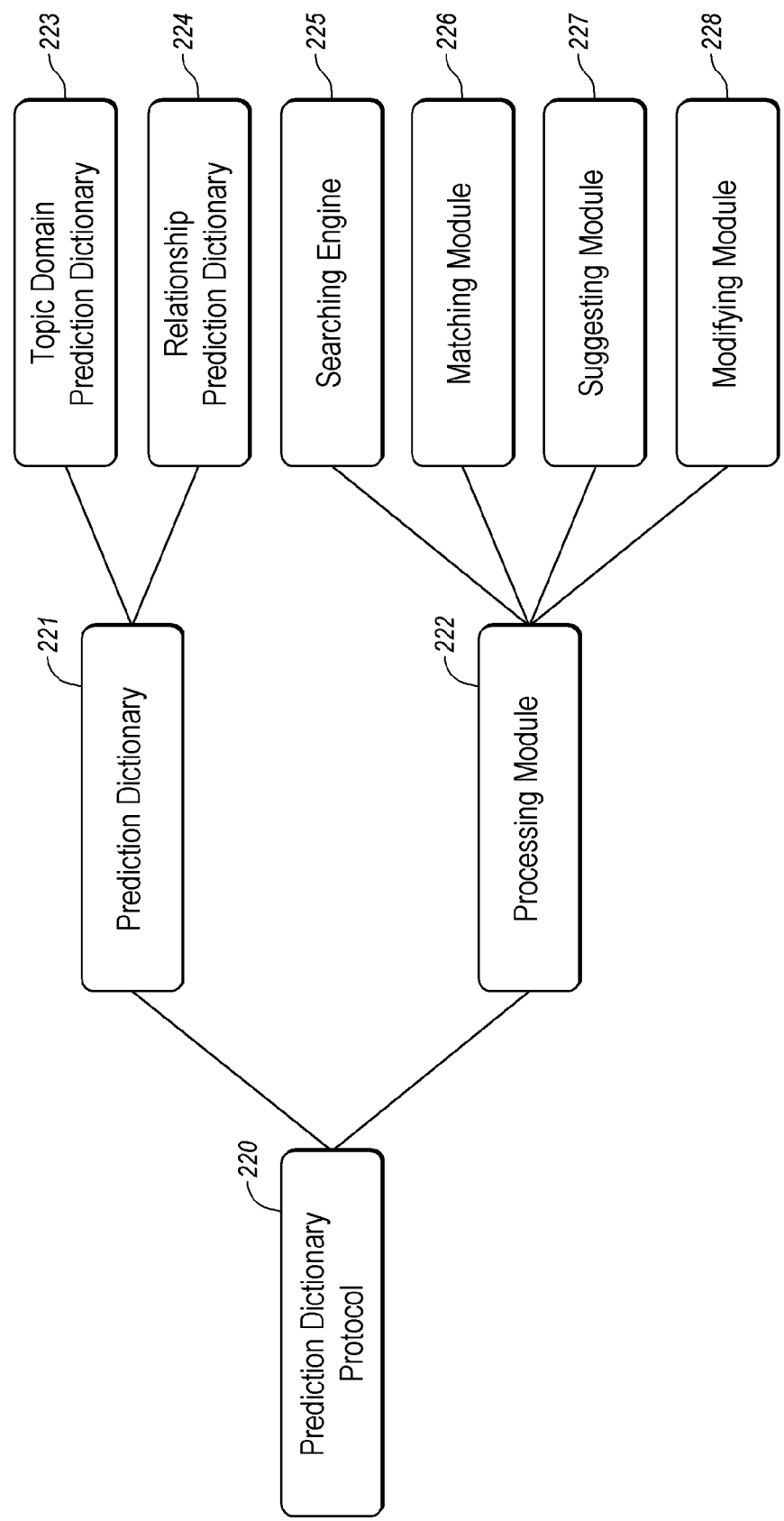
FIG. 2C illustrates an example of the structure of a prediction dictionary protocol.

FIG. 2C illustrates an example of the structure of a prediction dictionary protocol arranged in accordance with at least some embodiments described herein. As illustrated in FIG. 2C, the prediction dictionary protocol 220 may include a prediction dictionary 221 and a processing module 222. As also illustrated, the prediction dictionary 221 can include a topic domain prediction dictionary 223 and a relationship prediction dictionary 224, and the processing module 222 can include a search engine 225, a matching module 226, a suggesting module 227, and a modifying module 228. The prediction dictionary 221 may contain different types of prediction dictionaries, such as a topic domain prediction dictionary 223 and a relationship prediction dictionary 224. The prediction dictionary 221 may include one or more databases, and each database may contain words, morphactins, punctuation marks, and sentences of the one or more natural languages 101, the one or more symbols 102 or the one or more emoticons 103 frequently used or featured in a setting or text environment, such as a topic domain (e.g., type of environment) or a relationship (e.g., correspondent to receive message from user). The topic domain and the relationship, with respect to the user and recipient of the input content 100, can determine the types of recommended content to be generated or predicted. The topic domain of the topic domain prediction dictionary 223 can include any topic, such as the topic of school, work, business, family or friendship as well as many other types of topics relevant to the textual environment. The relationship of the relationship prediction dictionary 224 may include any type of relationship between the user and the recipient of the input content 100, such as relationship between classmates, coworkers, business partners, family members or friends. The prediction dictionary 221 may contain other types of prediction dictionaries, and may not be limited to the description herein.

The prediction dictionary 221 can be created based on existing dictionaries, such as a Chinese language dictionary or a Japanese language dictionary as well as any dictionary of the one or more natural languages 101. The prediction dictionary 221 can also be created based on some other materials, such as a user's previous communication records regarding a particular topic domain or a particular relationship. The previous communication records can be any records the user has communicated in the past, especially in view of the topic domain and/or the relationship of the intended recipient of the communication. For example, frequently used or featured words, morphactins, punctuation marks, sentences of the one or more natural languages 101, the one or more symbols 102 or the one or more emoticons 103 can be extracted from a user's (e.g., sender) previous communication records to a certain business partner (e.g., receiver), to create a business topic domain prediction dictionary. Frequently used or featured words, morphactins, punctuation marks, sentences of the one or more natural languages 101, the one or more symbols 102 or the one or more emoticons 103 can be extracted from such records to create a business partner relationship prediction dictionary.

Frequently used or featured words, morphactins, and punctuation marks of the one or more natural languages 101 as well as the one or more symbols 102 or the one or more emoticons 103 in the prediction dictionary 221 can be extracted with the "term frequency-inverse document frequency (TD-IDF)" weight through the following Equation 1.

$$tf \cdot idf(w_{i,j}) = \frac{w_{i,j}}{\sum_{j=0}^{m} w_{i,j}} \cdot \log\left(\frac{m}{1 + |\{s_j : s_j \ni \{w_i > t\}\}|}\right) \quad \text{Equation 1}$$

For Example, one or more words, morphactins, and punctuation marks of the one or more natural languages 101 as well as one or more symbols 102 or one or more emoticons 103 may be extracted from materials related to the topic domain or the relationship, such as the previous communications records related to the topic domain or the relationship, common dictionaries or similar sources. In the above Equation 1, the materials used to extract the words, morphactins, and punctuation marks of the one or more natural languages 101 as well as the one or more symbols 102 or the one or more emoticons 103 may be referred as m. Each of the one or more words, morphactins, and punctuation marks of the one or more natural languages 101 as well as one or more symbols 102 or one or more emoticons 103 can be generally referred to as a word or w. A list of the words, morphactins, and punctuation marks of the one or more natural languages 101 as well as the one or more symbols 102 or the one or more emoticons 103 may be referred as $L_j$. Nonfunctional words or morphactins such as "a," "the," "and," "or," or "is" may be removed from the list $L_j$ to create a metadata candidate word list $MC_i$ for a predictive dictionary PDi, for a user "i". This can be done with respect to a recipient "j". Local term frequency tf is the frequency of occurrence of each of the words, morphactins, and punctuation marks of the one or more natural languages 101 as well as the one or more symbols 102 or the one or more emoticons 103 that appeared in the material from which the words, morphactins, and punctuation marks of the one or more natural languages 101 as well as the one or more symbols 102 or the one or more emoticons 103 are extracted. Document frequency df is the number of documents that contain the words, morphactins, and punctuation marks of the one or more natural languages 101 as well as the one or more symbols 102 or the one or more emoticons 103 that appeared in all the materials used for the extraction. For example, if there are 10 documents, and all of the documents contain the word "they", then, df of "they" is 10. When only one document contains the word "unique", df of "unique" is 1. Large df scores indicate that the word is not so important compared to words with small df scores because the large df score indicates that the word appears commonly in many documents. The tf and df may then be calculated. A frequently used and featured words list $w_i$ can then be created based on the tf and df, where the tf is larger than a threshold $t_1$ and df is smaller than a threshold $t_2$. Additional information regarding Equation 1 can be obtained from Baeza-Yates, R. and Ribeiro-Neto, B. "Modern Information Retrieval". ACM Press/Addison-Wesley, 1999, which is incorporated herein by specific reference in its entirety.

As illustrated in FIG. 2C, the prediction dictionary protocol 220 may include a processing module 222; however, the processing module 222 is not necessary for some systems. The processing module 222 may include a searching engine 225, which can be used to search the words, morphactins, sentences, and punctuation marks of the one or more natural languages 101 as well as the one or more symbols 102 or the one or more emoticons 103 which match the input content 100. The processing module 222 may include a matching module 226 that may be used to compare the words, morphactins, sentences, and punctuation marks of the one or more natural languages 101 as well as the one or more symbols 102 or the one or more emoticons 103 with the input content 100. The processing module 222 may include a suggesting module 227 that may be used to suggest the predicted content, such as matched or similar words, morphactins, sentences, and punctuation marks of the one or more natural languages 101 as well as the one or more symbols 102 or the one or more emoticons 103 with the input content 100 to a user through displaying the predicted content on a screen to the user. The processing module 222 may also include a modifying module 228 that may be used to modify the prediction dictionary 221. The function of the modifying module 228 may include: adding the words, morphactins, sentences, and punctuation marks of the one or more natural languages 101 as well as the one or more symbols 102 or the one or more emoticons 103 which were not previously stored in the prediction dictionary 221; correcting the mistakes in the prediction dictionary 221; deleting unused words, morphactins, sentences, and punctuation marks of the one or more natural languages 101 as well as the one or more symbols 102 or the one or more emoticons 103 stored in the prediction dictionary 221 after a certain period of time; or updating the prediction dictionary 221 with new types of prediction dictionary after a certain period of time.

The prediction dictionary protocol 220 can be used to facilitate the prediction of the input content 100, such as to predict words, morphactins, sentences, and punctuation marks of the one or more natural languages 101 as well as the one or more symbols 102 or the one or more emoticons 103 based on the input content 100 provided by the user. The predicted input content can be recommended input content that is recommended to the user based on what was input into the computing device by the user. For example, a user may use the generating protocol 210 for the English language to generate and input the characters "me." Here the characters "me" may become part of the input content 100. Based on the input content 100, the processing module 222 of the prediction dictionary protocol 220 for a business topic domain may search the business topic domain prediction dictionary and suggest the predicted content (e.g., recommended input content), such as a word list including word "met" or "meeting" to the user. The user may accept the predicted content through choosing the suggested word "meeting." Here the newly chosen word "meeting" may become part of the input content 100. Based on the input content 100, the processing module 222 may further search the business topic domain prediction dictionary and suggest the predicted content to the user, such as the word "schedule." The user may accept the predicted content through choosing the suggested word "schedule." Here the "meeting schedule" may become part of the input content 100. Based on the input content 100, the processing module 222 may then search the business topic domain prediction dictionary and suggest the predicted content, such as a sentence "what is the meeting schedule for tomorrow?" on a screen to the user. The user may accept the predicted content through choosing the suggested sentence "what is the meeting schedule for tomorrow?", which may become part of the input content 100. The user may not accept the predicted content through not choosing anything in the predicted content.

In another example, the user may not accept the predicted content through not choosing the suggested word "met" or "meeting" from the word list, but rather may generate and input the word "meet." Here the user generated and inputted word "meet" may become part of the input content 100. Based on the input content 100, the processing module 222 may further search the business topic domain prediction dictionary and suggest the predicted content to the user, such as the sentence "let's meet in the office today." The user may not accept the predicted content through not choosing the suggested sentence "let's meet in the office today." Here the predicted content "let's meet in the office today" may not become part of the input content 100. The user may not accept the predicted content by simply ignoring the predicted content and continuing to input characters into the computing device. On the other hand, the computing device may present a cancel button to the user, and the user can select the cancel button to cancel the predicted content. The user may further generate and input a sentence such as "let's plan to meet for lunch today." Here the newly generated and inputted sentence "let's plan to meet for lunch today" may become part of the input content 100. Of course the user may accept the predicted content "let's meet in the office today" and may then edit the sentence to "let's plan to meet for lunch today." The word "meet" and the sentence "let's plan to meet for lunch today" may not previously have been stored in the business topic domain prediction dictionary. The processing module 222 may then add those newly generated and inputted words and sentences to the business topic domain prediction dictionary, and may therefore search and suggest such words and sentences upon subsequent input of "me" into the computing device with respect to the topic domain and the relationship between the user and the recipient of the input content 100.

When the input protocol 200 is changed by a user or a computing device, it can be either the generating protocol 210 being switched, or the prediction dictionary protocol 220 being switched, or both. The generating protocol 210 and the prediction dictionary protocol 220 can be switched separately. The user or computing device can switch the generating protocol 210 to a different generating protocol, such as from a natural language generating protocol A to a natural language generating protocol B, or from the symbol generating protocol 212 to the emoticon generating protocol 213, while keeping the same prediction dictionary protocol 220. The user or computing device can also change the prediction dictionary protocol 220 while keeping the same generating protocol 210. The generating protocol 210 and the prediction dictionary protocol 220 can also be switched simultaneously or correspondingly, under which situation the generating protocol 210 can be switched at the same time when the prediction dictionary protocol 220 is switched, either manually or automatically.

For example, a user can switch the prediction dictionary 221 which only contains words for the Japanese language to the prediction dictionary 221 which only contains words for the Chinese language when the user switches the generating protocol 210 from the Japanese language to the Chinese language. On the other hand, the user can keep the same business partner relationship prediction dictionary for both the Chinese language generating protocol and the English language generating protocol because the business partner relationship prediction dictionary can include words, morphactins, sentences and punctuation marks of the one or more natural languages 101 as well as the one or more symbols 102 or the one or more emoticons 103 which may be shared by both languages. The computing device can also be used to determine the relationship between the generating protocol 210 and the prediction dictionary protocol 220, and therefore can switch them correspondingly and automatically based on the relationship of the user and the recipient of the input content 100 generated and inputted by the user.

Figure 3A:
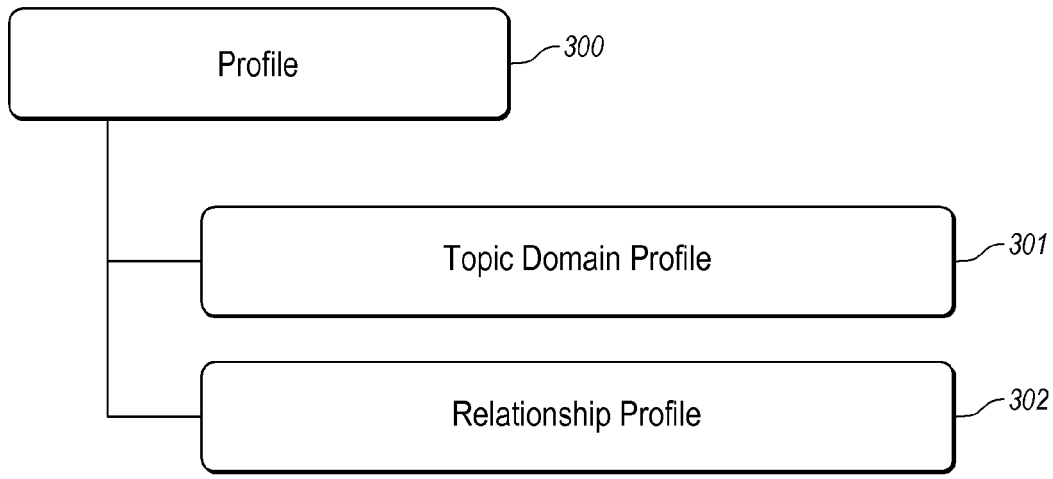
FIG. 3A illustrates an example of a profile including a topic domain profile and a relationship profile.

FIG. 3A illustrates an example of a profile including a topic domain profile and a relationship profile arranged in accordance with at least some embodiments described herein. As illustrated in FIG. 3A, a profile 300 may include any type of profile, such as a topic domain profile 301 and a relationship profile 302. The profile 300 may be a database, and may contain words, morphactins, punctuation marks of the one or more natural languages 101, the one or more symbols 102 or the one or more emoticons 103 frequently used or featured in a setting or text environment, such as a topic domain (e.g., type of environment) or a relationship (e.g., correspondent to receive message from user). The topic domain profile 301 can include one or more topic domains, which can be generally described as general topics related to the text or for which the text regards. A topic domain of the topic domain profile 301 can include any topic, such as the topic of school, work, business, family or friendship as well as many other types of topics relevant to the textual environment. The relationship profile 302 can include one or more relationships between the user and an intended recipient of the text. A relationship of the relationship profile 302 may include any type of relationship between the user and the recipient of the input content 100, such as relationship between classmates, coworkers, business partners, family members or friends. The profile 300 may contain other types of the profiles, and may not be limited to the description herein. Generally, the one or more indivisible individual units 104 can be used to calculate a similarity or difference between the input content 100 and a profile 300. A profile 300 that has greater similarity of the input content can be used for generating and providing predicted text.

The profile 300 can be created based on existing dictionaries, such as a Chinese language dictionary or a Japanese language dictionary or English language dictionary as well as any dictionary of the one or more natural languages 101. The profile 300 can also be created based on some other materials, such as a user's previous communication records regarding a topic domain or a relationship. The previous communication records can be any records the user has communicated in the past, especially in view of the topic domain and/or the relationship of the intended recipient of the communication. For example, frequently used or featured words, morphactins, punctuation marks of the one or more natural languages 101, the one or more symbols 102 or the one or more emoticons 103 can be extracted from user's (e.g., sender) previous communication records to a certain business partner (e.g., receiver), to create a business topic domain profile. Similarly, any other type of topic domain profile 301 can be created and stored on the computing device. Frequently used or featured words, morphactins or punctuation marks of the one or more natural languages 101, the one or more symbols 102 or the one or more emoticons 103 can be extracted from such records to create a business partner relationship profile. Similarly, any other type of relationship profile 302 can be created and stored on the computing device.

In the profile 300, the words and morphactins of the one or more natural languages 101 may contain functional words and morphactins. Nonfunctional words and morphactins of the one or more natural languages 101 such as "the," "and," "or," "for," or "is" may be deleted. Frequency of occurrence of each frequently used or featured words, morphactins, punctuation marks of the one or more natural languages 101, the one or more symbols 102 and the one or more emoticons 103 may be calculated, and a value may be used to reflect such frequency of occurrence. Each of the words, morphactins, punctuation marks of the one or more natural languages 101, the one or more symbols 102 and the one or more emoticons 103 contained in the profile 300 may be assigned with a specific value of frequency of occurrence. The value of frequency of occurrence may be determined through simply counting the occurrence of each of the frequently used or featured words, morphactins, punctuation marks of the one or more natural languages 101, the one or more symbols 102 and the one or more emoticons 103 that have appeared in some existing text relating to the topic domain or the relationship between the user and the recipient of the input content 100. The value of frequency of occurrence can be determined with a more accurate weight, such as term frequency-inverse document frequency (TD-IDF) weight as described in connection to Equation 1 provided herein. The value of frequency of occurrence can also be simply determined with a fixed value, which value may represent the importance of a word, a morphactin or a punctuation mark of the one or more natural languages 101, an individual symbol of the one or more symbols 102 or an individual emoticon of the one or more emoticons 103 related to the topic domain or the relationship between the user and the recipient of the input content 100.

Figure 3B:
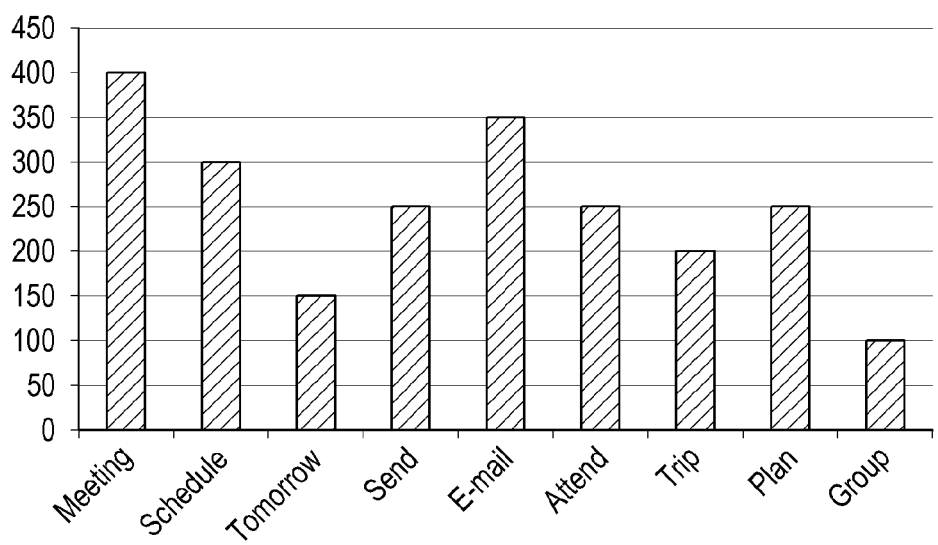
FIG. 3B illustrates an example of a word-frequency of occurrence histogram for a profile.

FIG. 3B illustrates an example of a word-frequency of occurrence histogram for a profile arranged in accordance with at least some embodiments described herein. As illustrated in FIG. 3B, a word-frequency of occurrence histogram can illustrate frequency of words of a profile 300 or in a text input by the user. The word-frequency of occurrence histogram can include a horizontal axis that may represent the frequently used or featured words of the one or more natural languages 101, and the vertical axis of the histogram may represent the value of frequency of occurrence of each word, and a vertical axis may represent frequency of occurrence of the words of the horizontal axis. As illustrated in FIG. 3B, the frequently used or featured words with value of frequency of occurrence for a business topic domain profile or a business relationship profile may include: (Meeting, 400), (Schedule, 300), (Tomorrow, 150), (Send, 250), (E-mail, 350), (Attend, 250), (Trip, 200), (Plan, 250), (Group, 100). The value of frequency of occurrence of each word in FIG. 3B may be simply calculated through counting the occurrence in some existing materials related to a business topic domain or a business relationship. The value of frequency of occurrence of each word in FIG. 3B can be calculated with adding more accurate weight, such as a TD-IDF weight as described in connection with Equation 1 provided herein. The value of frequency of occurrence of each word in FIG. 3B can also be determined by a fixed value to show the importance of such word related to the business topic domain or the business relationship. For example, the word "meeting" may be frequently used in the business environments, and may be treated as a featured word of the business topic domain and the business relationship. Therefore, the word "meeting" may be assigned with a high value of frequency of occurrence such as "400" to show its importance to the business topic domain and the business relationship.

Figure 4:
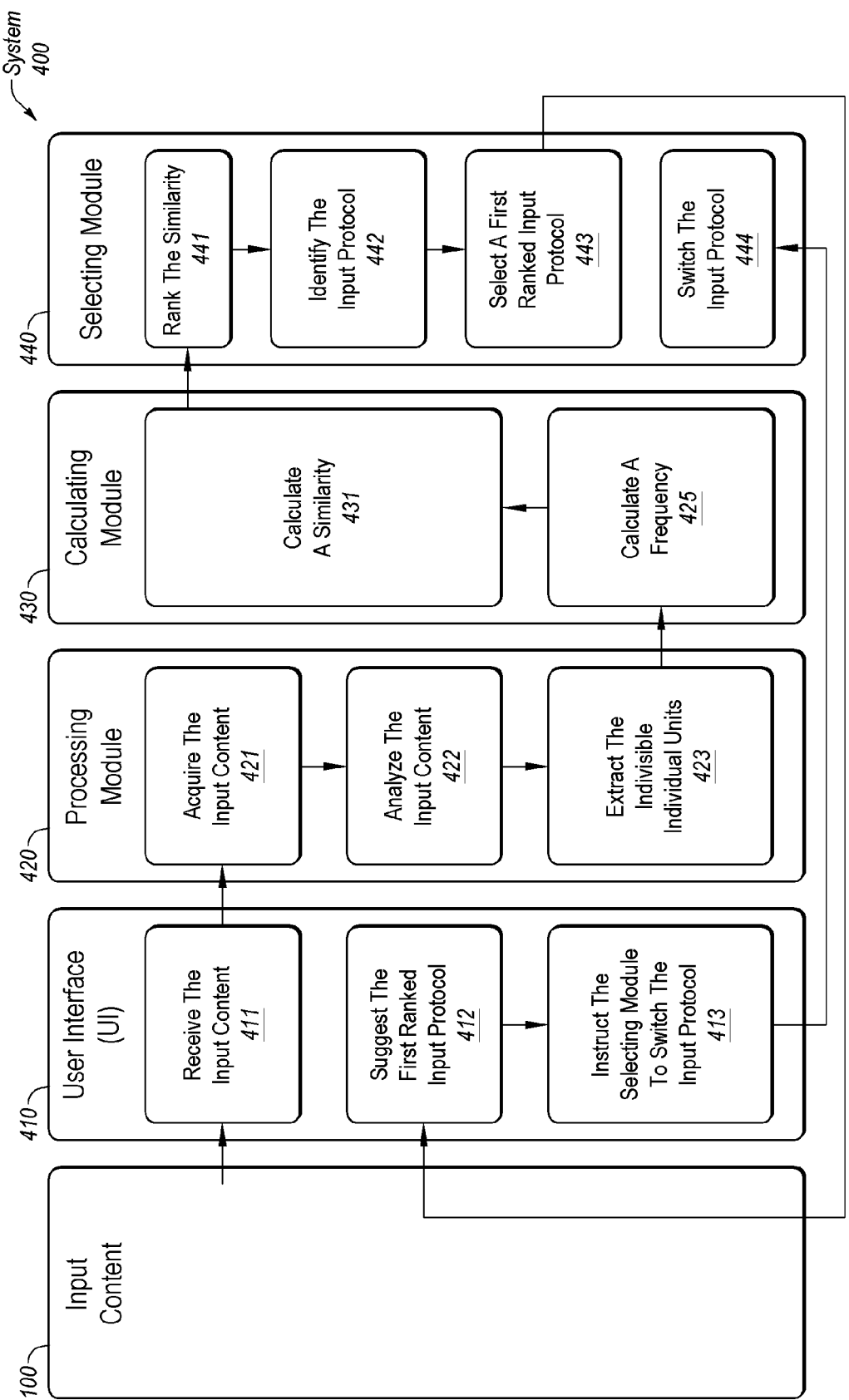
FIG. 4 illustrates an example of a system and method for selecting an input protocol based on an input.

FIG. 4 illustrates an example of a system and method for selecting an input protocol based on an input arranged in accordance with at least some embodiments described herein. As illustrated in FIG. 4, a system 400 can be provided configured for selecting the input protocol 200 based on the input content 100. The system 400 can be provided as a single computing device or a group of computing devices in a computing system, which computing devices can be physically coupled or wirelessly coupled. Accordingly, there are instances that the computing device that can implement the protocols described herein can be part of a computing system, such as the system 400 including one or more devices, such as a smart phone or tablet or the like or network operably coupling the same.

As illustrated in FIG. 4, the system 400 can include a UI 410, a processing module 420, a calculating module 430, and a selecting module 440. The UI 410 may be used to receive the input content 100, and thereby allows the user to input information and receive information with regard to the system 400. The UI 410 can be any type of user interface. However, common mobile computing systems use touch screens, which provide a graphic user interface (GUI) that receives and provides information with respect to a user. As such, use of GUI here can also generally refer to any type of UI.

A user can touch the touch screen or keyboard and use the generating protocol 210 and the prediction dictionary protocol 220 to generate and input the input content 100. The input content 100 can then be acquired through an Application Programming Interface (API). The UI 410 may also contain an image generating device, such as a camera. A user can use the camera to take a picture of the input content 100, such as a picture of a printed out e-mail or a communication record. The image of the input content 100 can then be converted into a text format of the input content 100 through an Optical Character Recognizer (OCR) module (not shown). The UI 410 may further contain a detecting module (not shown), which can be used to automatically detect whether there are existing previous communication records between the user and the recipient of the input content 100 in an application, and to extract a part of such records as the input content 100 for further processing, such as to be used to determine the input protocol 200. Accordingly, the UI 410 can be used to receive the input content into the system 400 ("RECEIVE THE INPUT CONTENT," block 410).

The processing module 420 may acquire the input content 100 and then process the input content 100 through a language identifier, such as Rosette Language Identifier (RFI), which is a commercial software designed for Natural Language Processing. However, any type of the language identifier can be used. The identified results may include the type of the one or more natural languages 101, whether the one or more symbols 102 or the one or more emoticons 103 are contained in the input content 100, or the encoding code of the input content 100. Accordingly, the processing module 420 can be used to acquire the input content from the UI 410 ("ACQUIRE THE INPUT CONTENT," block 421") and then analyze the input content ("ANALYZE THE INPUT CONTENT," block 422).

The one or more indivisible individual units 104 of the input content 100 can then be extracted by the processing module 420 ("EXTRACT THE INDIVISIBLE INDIVIDUAL UNITS," block 423). The extraction may depend on the type of the input content 100. When the input content 100 contains the one or more natural languages 101 with spaces between words and sentences, such as the English language, a part-of-speech tagger (POS tagger) may be used to divide the input content 100 into words. On the other hand, for the one or more natural languages 101 which contain no spaces between words or morphactins, such as the Japanese language or the Chinese language, a morphological analyzer can be used to extract morphactins from the input content 100. When the input content 100 contains one or more symbols 102 and one or more emoticons 103 separated by spaces, they can be extracted through detecting the spaces between the one or more symbols 102 or the one or more emoticons 103, and a POS tagger may be used for such extraction.

It should be noted that, the input content 100 analyzing process and the one or more indivisible individual units 104 extracting process described herein may be conducted through other efficient systems or software, the details of which processes are not described herein.

As a result of the one or more indivisible individual units 104 extracting process, words, morphactins, punctuation marks of the one or more natural languages 101, the one or more symbols 102 or the one or more emoticons 103 that appeared in the input content 100 are extracted. The words and morphactins may only contain functional words and morphactins, and nonfunctional words and morphactins, such as "the," "and," "or," "for," or "is," may be deleted.

The calculating module 430 can receive the extracted one or more indivisible individual units 104 from the processing module 420, and then calculate the frequency of occurrence of each extracted indivisible individual unit ("CALCULATE A FREQUENCY", block 425). The value of such frequency of occurrence may be assigned with each extracted indivisible individual unit. The value of frequency of occurrence of each extracted indivisible individual unit may be determined through simply counting the occurrence of each extracted indivisible individual unit in the input content 100. The value of frequency of occurrence can also be determined with a more accurate weight, such as term frequency-inverse document frequency (TD-IDF) weight by using Equation 1 above.

For example, the input content 100 may be: "What is the meeting schedule for tomorrow? Have you already booked the meeting room? Have you already sent e-mails to everyone who will attend the meeting?" The extracted indivisible individual unit with value of frequency of occurrence may be as shown in Table 1.

TABLE 1

Indivisible Individual Unit with Value of Frequency of Occurrence

| | Indivisible Individual Unit | | | | | | | |
|---|---|---|---|---|---|---|---|---|
| | meeting | schedule | tomorrow | book | room | send | e-mail | attend |
| Value of Frequency of Occurrence | 3 | 1 | 1 | 1 | 1 | 1 | 1 | 1 |

In the above Table 1, the value of frequency of occurrence may be simply calculated through counting the occurrence of the extracted indivisible individual unit in the input content 100.

The extracted indivisible individual unit with value of frequency of occurrence may also be as shown in Table 2.

TABLE 2

Indivisible Individual Unit with Value of Frequency of Occurrence

| | Indivisible Individual Unit | | | | | | | |
|---|---|---|---|---|---|---|---|---|
| | meet-ing | sched-ule | tomor-row | book | room | send | e-mail | at-tend |
| Value of Frequency of Occurrence | 10 | 6 | 2 | 1 | 1 | 1 | 6 | 6 |

In the above Table 2, the value of frequency of occurrence may be calculated with special weight to add the importance to some of the extracted indivisible individual units over others, such as by using Equation 1.

The extracted indivisible individual unit with or without value of frequency of occurrence then can be used by the calculating module 430 in order to calculate similarity between the input content 100 and a profile 300 ("CALCULATE A SIMILARITY," block 431). Referring again to FIG. 3A, the profile 300 may include any type of profile, such as a topic domain profile 301 and a relationship profile 302.

The calculation of the similarity can be performed for more than one profile. That is, the input content 100 can be compared to one or more profiles in order to determine one or more similarities and one or more similarity values. Accordingly, the input content 100 may be more similar to one profile 300 than to another different profile 300.

After the similarity between the input content 100 and the profile 300 is calculated and the value of the similarity is obtained for multiple profiles, the calculating module 430 can provide the similarity information to the selecting module 440. The selecting module 440 may rank the similarity with respect to a group of a plurality of similarities are determined from a group of profiles. That is, the similarity of the input content 100 and a profile 300 can be ranked against a similarity of the input with other profiles ("RANK THE SIMILARITY," block 441). The ranking can be based on the numerical size of the calculated value of the similarity between the input and one profile 300 compared to other profiles. Because each profile 300 corresponds to a similarity value with the same input content 100, the profile 300 can then be identified with the similarity value, and can therefore be ranked in order of the numerical size of such similarity value as well. For example, as illustrated in Table 3, with the same input content 100, the similarity value of profile A is 4.8; the similarity value of profile B is 4.1; the similarity value of profile C is 5.6; the similarity value of profile D is 6.8; and the similarity value of profile E is 9.1. Each profile 300 with the calculated value of similarity can then be identified and ranked compared to other profiles as shown in Table 3.

TABLE 3

Profiles Ranked with Similarity Value

| Ranking | Similarity Value | Profile | Property 1 | Property 2 | Property 3 |
|---|---|---|---|---|---|
| 1 | 9.1 | Profile E | Topic domain: Business | Japanese | Symbol |
| 2 | 6.8 | Profile D | Relationship: Business Partner | English | Emoticon |
| 3 | 5.6 | Profile C | Relationship: Co-worker | Chinese | Symbol/Emoticon |
| 4 | 4.8 | Profile A | Topic domain: Work | Chinese | Symbol |
| 5 | 4.1 | Profile B | Topic domain: School | English | Symbol/Emoticon |

In one embodiment, the calculating module 430 of the system 400 may calculate a similarity between the input content 100 and the profile 300 through a vector-space model calculation function of Equation 2 or Equation 3.

$$f_{correlation}(h1, h2) := \sum_{i=1}^{n} h1_{[i]} h2_{[i]} \quad \text{Equation 2}$$

$$f_{histogram\_intersection}(h1, h2) := \sum_{i=1}^{n} \frac{\min(h1_{[i]}, h2_{[i]})}{\sum_{j=1}^{n} h1_{[j]}} \quad \text{Equation 3}$$

In Equations 2 or 3, h1 may represent a "value of frequency of occurrence of the one or more indivisible individual units 104 in the profile 300," and h2 may represent a "value of frequency of occurrence of the one or more indivisible individual units 104 extracted from the input content 100." A value of the similarity may be obtained after the similarity calculation. The similarity between the input content 100 and the profile 300 may be calculated through other functions, which details may not be limited to the functions described herein.

Therefore, the first ranked topic domain profile is profile E, with a similarity value of 9.1, which may be a business topic domain profile. The first ranked relationship profile is relationship profile D, with a similarity value of 6.8, which may be a business partner relationship profile. The profile 300 may be defined with several properties. As illustrated in Table 3, the properties of the profile 300 may include "Property 1" of "Type of the prediction dictionary 221", "Property 2" of "Type of the one or more natural languages 101", and "Property 3" of "Type of the one or more symbols 102 or the one or more emoticons 103." Such properties can then be used to determine the input protocol 200 for the input content 100.

Based on the rank of the similarity of the input content with the profile 300 with respect to other profiles, the selecting module 440 can then identify the input protocol as having the highest ranked similarity ("IDENTIFY THE INPUT PROTOCOL," block 442). For example, as illustrated in Table 3, the first ranked profile is Profile E, with a topic domain of "Business" in column "Property 1," a relationship of "Business Partner" in column "Property 1," a "Japanese" language type in column "Property 2," and a "Symbol" in column "Property 3." The selecting module 440 of system 400 can then determine the input protocol 200 for the input content 100 with: Japanese language generating protocol, symbol generating protocol, a business topic domain prediction dictionary and a business partner relationship prediction dictionary. The input protocol 200 identified based on the properties of the first ranked profile can then be treated as the first ranked input protocol with a highest similarity.

The selecting module 440 of the system 400 may then select the first ranked input protocol for use for the input content 100 ("SELECT A FIRST RANKED INPUT PROTOCOL," block 443). After being selected, the selecting module can suggest the first ranked input protocol to a user through the UI 410 ("SUGGEST THE FIRST RANKED INPUT PROTOCOL," block 412). The suggesting may be in any format. The first ranked input protocol may be displayed in a pop-up window, displayed with a strong color in the input area, or flashed in an input area of the UI 410. After being suggested, the user can select the first ranked input protocol. The UI 410 may then instruct the selecting module 440 to switch a currently input protocol to the first ranked input protocol ("INSTRUCT THE SELECTING MODULE TO SWITCH THE INPUT PROTOCOL," 413). The instruction can be provided after acceptance by the user or after a period of time. Also, the selected first ranked protocol may also be automatically selected and used by the system 400.

When suggesting the first ranked input protocol to the user, the UI 410 may request an input protocol switching command from the user, which may be the user's permission or instruction of switching the current input protocol. The UI 410 may then proceed corresponding to the user's permission or instruction. The user may not respond within a certain period of time, under such situation, the UI 410 may not instruct the selecting module 440 to switch a current input protocol to the first ranked input protocol, and may maintain the current input protocol. Alternatively or additionally, the UI 410 may automatically instruct the selecting module 440 to switch a current input protocol to the first ranked input protocol after such period of time. On the other hand, the user may respond within a certain period of time, which response may be permission of the suggested input protocol switching or instruction of different input protocol switching. The UI 410 may then proceed to instruct the selecting module 440 to switch a current input protocol whether or not corresponding to the user's permission or instruction. The selecting module 440 may then proceed to either maintain the current input protocol or switch the current input protocol to a different input protocol corresponding to the instruction of the UI 410.

In any event, the selecting module can switch the input protocol based on the similarity of the input content 100 with the profile 300 ("SWITCH THE INPUT PROTOCOL," block 444).

Figure 5:
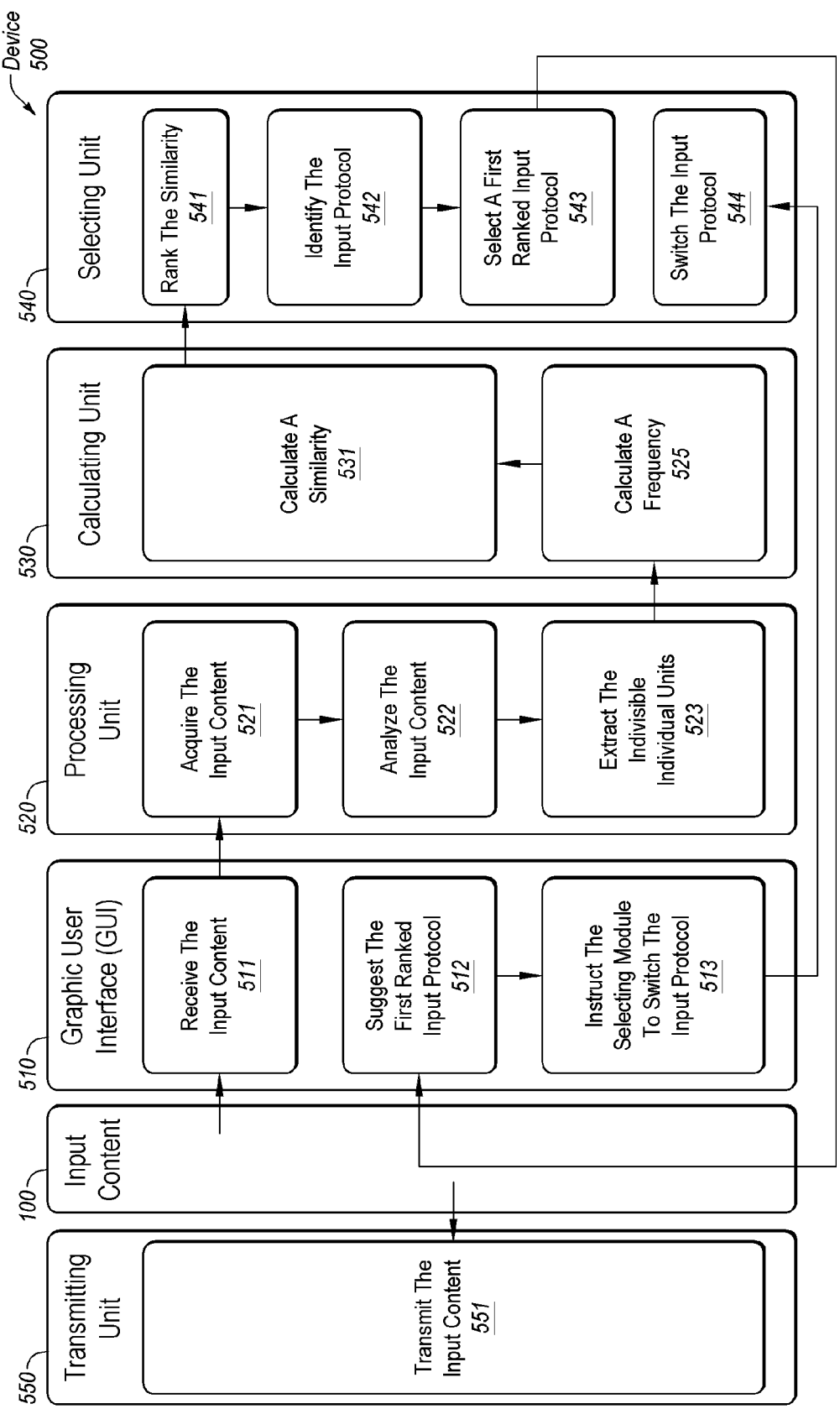
FIG. 5 illustrates an example of a device and method for selecting an input protocol based on an input content.

FIG. 5 illustrates an example of a device and method for selecting an input protocol based on an input content arranged in accordance with at least some embodiments described herein. As illustrated in FIG. 5, a device 500 configured for selecting the input protocol 200 based on the input content 100 may include a graphic user interface (GUI) 510, a processing unit 520, a calculating unit 530, a selecting unit 540 and a transmitting unit 550. As noted above, the GUI 510 may be any type of the UI 410. The GUI 510, the processing unit 520, the calculating unit 530, and the selecting unit 540 of the device 500 may have similar functions with the UI 410, the processing module 420, the calculating module 430, and the selecting unit 440 of the system 400, as described herein. The device 500 may further contain a transmitting unit 550, which may be used to transmit the input content 100 through an internet, a wireless network, or the alike. The device 500 may be any computing device such as a laptop, desktop, or mobile device, such as a smart phone, a tablet, or the like.

Accordingly, the GUI 510 can receive input content 100 from a user ("RECEIVE THE INPUT CONTENT," block 511), and the processing unit 520 can acquire the input content 100 from the GUI 510 ("ACQUIRE THE INPUT CONTENT," block 521"). The processing unit 520 can analyze the input content ("ANALYZE THE INPUT CONTENT," block 522), and extract the indivisible individual units ("EXTRACT THE INDIVISIBLE INDIVIDUAL UNITS," block 523). The calculating unit 530 can obtain the extracted indivisible individual units from the processing unit 520, and calculate a similarity between the extracted indivisible units and a profile ("CALCULATE A SIMILARITY," block 541). The selecting unit can then identify the highest ranked similarity between the extracted indivisible units and a plurality of profiles ("IDENTIFY THE INPUT PROTOCOL," block 542), and select the highest ranked similarity as the first ranked input protocol ("SELECT A FIRST RANKED INPUT PROTOCOL," block 543). The GUI 510 can then suggest the first ranked input protocol to the user ("SUGGEST THE FIRST RANKED INPUT PROTOCOL," block 512). Depending on the configuration, the GUI 510 can instruct the selecting module to switch the input protocol ("INSTRUCT THE SELECTING MODULE TO SWITCH THE INPUT PROTOCOL," block 513). The selecting unit 540 can then switch the input protocol from a current input protocol to the first ranked input protocol ("BLOCK SWITCH THE INPUT PROTOCOL," block 544). After the input content 100 is complete and ready for transmission from the user to a receiver, the transmitting unit 550 can then transmit the input content 100 to a computing system (e.g., device) of the receiver ("TRANSMIT THE INPUT CONTENT," block 551).

Figure 7:
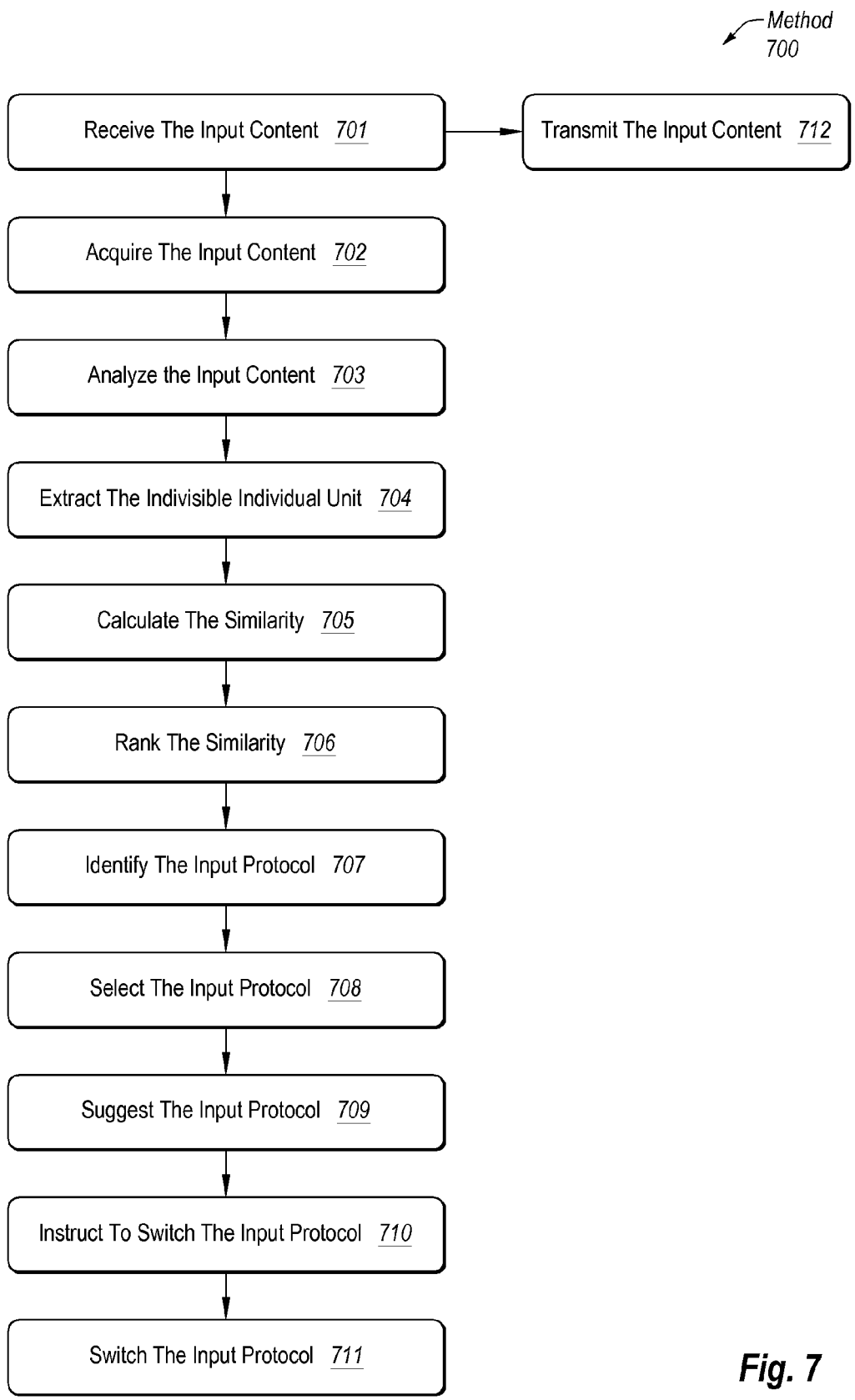
FIG. 7 illustrates an embodiment of a method for selecting an input protocol based on an input content.

FIG. 7 illustrates an embodiment of a method for selecting an input protocol based on an input content arranged in accordance with at least some embodiments described herein. As illustrated in FIG. 7, a general embodiment of a method 700 for selecting an input protocol based on input content can be performed. The method 700 may include: receiving input content through a GUI or a device ("RECEIVE THE INPUT CONTENT," block 701); acquiring the input content through an API or an image generating device ("ACQUIRE THE INPUT CONTENT," block 702); analyzing the input content through a language identifier ("ANALYZE THE INPUT CONTENT," block 703); extracting one or more indivisible individual units from the input content ("EXTRACT THE INDIVISIBLE INDIVIDUAL UNIT," block 704); calculating a similarity between a first frequency of occurrence of the one or more indivisible individual units and a second frequency of occurrence of the one or more indivisible individual units, wherein the second frequency of occurrence of the one or more indivisible individual units is predetermined with a second value of frequency of occurrence ("CALCULATE THE SIMILARITY," block 705); ranking the similarity based on a calculated similarity value ("RANK THE SIMILARITY," block 706); identifying the input protocol based on the numerical size of the calculated similarity value ("IDENTIFY THE INPUT PROTOCOL," block 707); selecting a first ranked input protocol having a highest similarity value ("SELECT THE INPUT PROTOCOL," block 708); suggesting the first ranked input protocol to the user ("SUGGEST THE INPUT PROTOCOL," block 709); instructing a device to either maintain a current input protocol or switch a current input protocol to another input protocol ("INSTRUCT TO SWITCH THE INPUT PROTOCOL," block 710); switching a current input protocol to another input protocol ("SWITCH THE INPUT PROTOCOL," block 711); and transmitting the input content through an internet, a wireless network or the like to a recipient ("TRANSMIT THE INPUT CONTENT," block 712).

Figure 8:
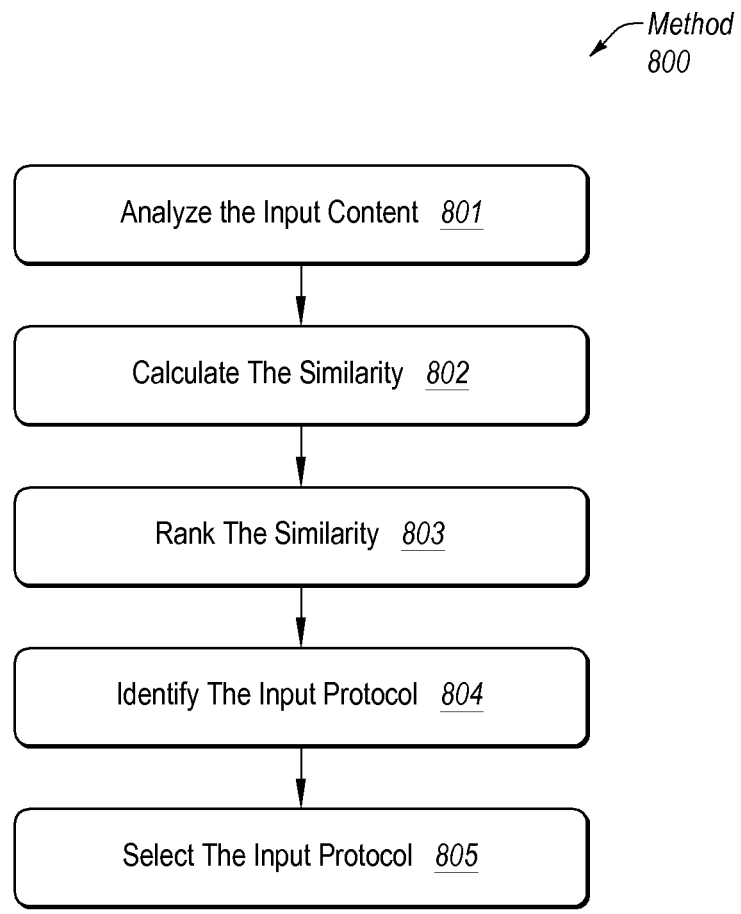
FIG. 8 illustrates an embodiment of a method for selecting an input protocol based on an input content.

FIG. 8 illustrates an embodiment of a method for selecting an input protocol based on an input content arranged in accordance with at least some embodiments described herein. As illustrated in FIG. 8, another embodiment of a method 800 for selecting an input protocol based on input content can be performed. The method 800 may include: analyzing input content ("ANALYZE THE INPUT CONTENT," block 801); calculating a similarity between the input content and a database ("CALCULATE THE SIMILARITY," block 802); ranking the similarity ("RANK THE SIMILARITY," block 803); identifying the input protocol based on the similarity ("IDENTIFY THE INPUT PROTOCOL," block 804); and selecting a first ranked input protocol having a highest similarity ("SELECT THE INPUT PROTOCOL," block 805).

Some embodiments disclosed herein include a computer-readable storage medium having computer-executable instructions stored thereon that are executable by a computing device to perform operations included in the system 400 of FIG. 4 or device of FIG. 5 as well as the method steps of FIGS. 7-8. In these and other embodiments, the computing device may be included in the system 400 and the device 500 and may include the features of a computing device 600 of FIG. 6.

In one embodiment, the present methods can include aspects performed on a computing system or any computing device. As such, the computing system or device can include a memory device that has the computer-executable instructions for performing the method. The computer-executable instructions can be part of a computer program product that includes one or more algorithms for performing any of the methods of any of the claims.

In one embodiment, any of the operations, processes, methods, or steps described herein can be implemented as computer-readable instructions stored on a computer-readable medium. The computer-readable instructions can be executed by a processor of a wide range of computing systems from desktop computing systems, portable computing systems, tablet computing systems, and hand-held computing systems as well as any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those generally found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Figure 6:
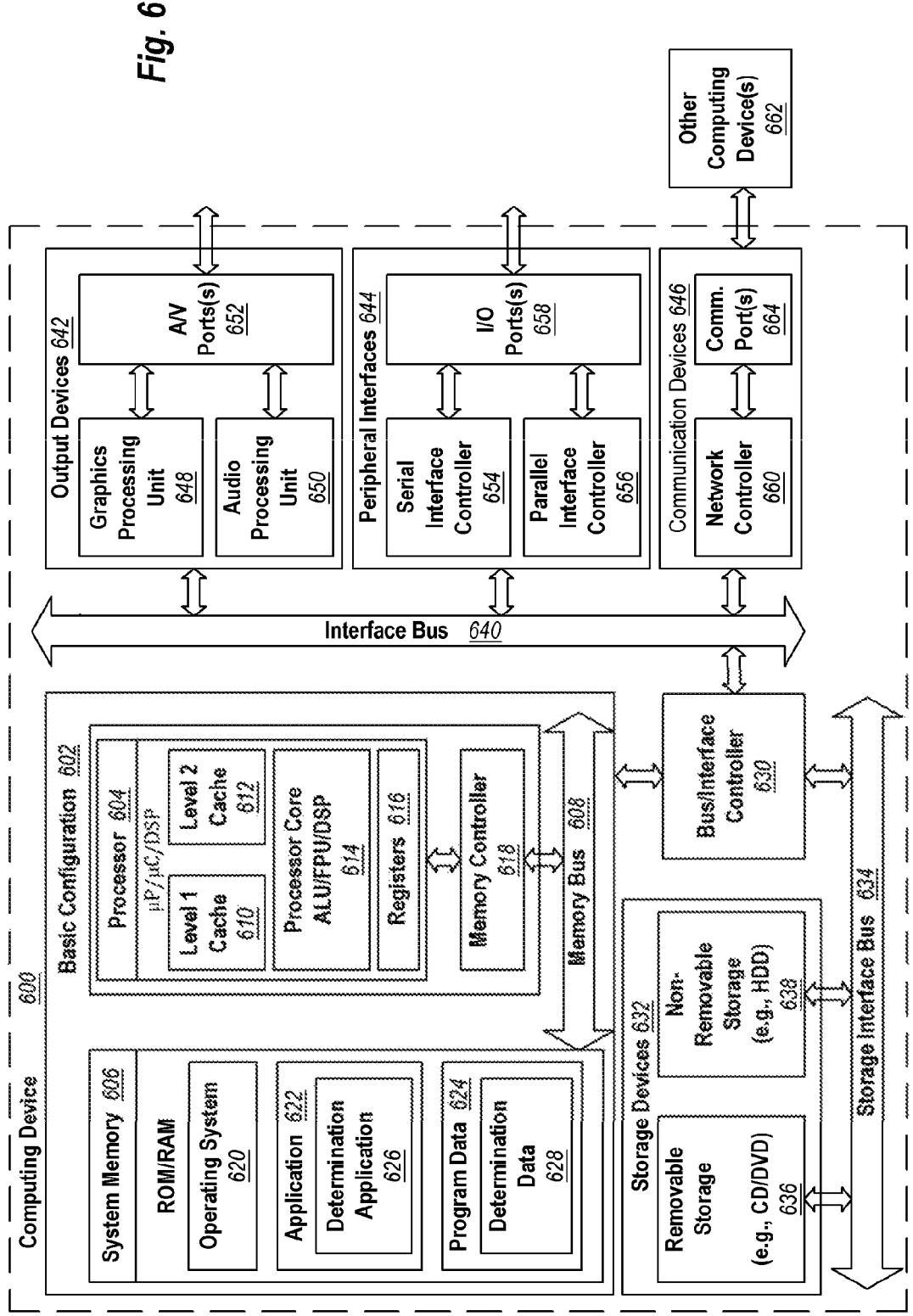
FIG. 6 illustrates an embodiment of a computing device that can be used for the systems and to implement the methods described herein.

FIG. 6 illustrates an embodiment of a computing device that can be used for the systems and to implement the methods described herein arranged in accordance with at least some embodiments described herein. As illustrated in FIG. 6, an example computing device 600 can be arranged to perform any of the computing methods described herein. In a very basic configuration 602, computing device 600 generally includes one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include a determination application 626 that is arranged to perform the functions as described herein including those described with respect to methods described herein. In some embodiments, application 622 may be arranged to operate with program data 624 on operating system 620 such that the work performed by untrusted computing nodes can be verified as described herein. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may generally be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations. The computing device 600 can also be any type of network computing device. The computing device 600 can also be an automated system as described herein.

The embodiments described herein may include the use of a special purpose or general-purpose computer including various computer hardware or software modules.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described herein, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into sub ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method to select an input protocol based on an input content, the method comprising:
   analyzing the input content that includes at least one of plain language text, punctuation, symbols, or emoticons;
   extracting one or more indivisible individual units from the input content;
   calculating one or more first frequency values of occurrence of the one or more indivisible individual units in the input content, each indivisible individual unit associated with a corresponding first frequency value included in the one or more first frequency values of occurrence;
   calculating one or more similarity values between the input content and one or more profiles based on a vector space model, wherein the vector space model is configured to output a corresponding similarity value between the input content and a corresponding profile as a correlation between the one or more first frequency values of occurrence of the one or more indivisible individual units in the input content and one or more second frequency values of occurrence of the one or more indivisible individual units in the corresponding profile, each indivisible individual unit associated with a corresponding second frequency value included in the one or more second frequency values of occurrence;
   ranking the one or more similarity values;
   identifying a first ranked input protocol associated with a highest similarity value based on the one or more similarity values; and
   selecting the first ranked input protocol associated with the highest similarity value,
   wherein:
      the first ranked input protocol is selected from a plurality of input protocols;
      the first ranked input protocol includes a generating protocol and a prediction dictionary protocol;
      the generating protocol includes a natural language generating protocol, a symbol generating protocol, and an emoticon generating protocol; and
      each of the plurality of input protocols includes a generating protocol with a different natural language generating protocol, symbol generating protocol, and emoticon generating protocol than generating protocols of others of the plurality of input protocols.

2. The method of claim 1, wherein the prediction dictionary protocol includes a topic domain prediction dictionary protocol and a relationship prediction dictionary protocol.

3. The method of claim 1, wherein:
   calculating the one or more first frequency values further comprises generating the one or more first frequency values through counting occurrence of each of the one or more indivisible individual units in the input content; and
   the correlation between the one or more first frequency values related to the input content and the one or more second frequency values in the corresponding profile includes a summation of products of the one or more first frequency values and the one or more second frequency values, each product including a corresponding first frequency value multiplied by a corresponding second frequency value.

4. A system to select an input protocol based on an input content, the system comprising:
   a processor; and
   a non-transitory computer-readable medium that includes computer-readable instructions stored thereon that are executable by the processor to perform or control performance of operations comprising:
      analyzing the input content that includes at least one of plain language text, punctuation, symbols, or emoticons;
      extracting one or more indivisible individual units from the input content;
      calculating one or more first frequency values of occurrence of the one or more indivisible individual units in the input content, each indivisible individual unit associated with a corresponding first frequency value included in the one or more first frequency values of occurrence;
      calculating one or more similarity values between the input content and one or more profiles based on a vector space model, wherein the vector space model is configured to output a corresponding similarity value between the input content and a corresponding profile as a correlation between the one or more first frequency values of occurrence of the one or more indivisible individual units in the input content and one or more second frequency values of occurrence of the one or more indivisible individual units in the corresponding profile, each indivisible individual unit associated with a corresponding second frequency value included in the one or more second frequency values;
      ranking the one or more similarity values;
      identifying a first ranked input protocol associated with a highest similarity value based on the one or more similarity values;
      selecting the first ranked input protocol associated with the highest similarity value; and
      suggesting the first ranked input protocol via a user interface,
      wherein:
         the first ranked input protocol is selected from a plurality of input protocols;
         the first ranked input protocol includes a generating protocol and a prediction dictionary protocol;
         the generating protocol includes a natural language generating protocol, a symbol generating protocol, and an emoticon generating protocol; and
         each of the plurality of input protocols includes a generating protocol with a different natural language generating protocol, symbol generating protocol, and emoticon generating protocol than generating protocols of others of the plurality of input protocols.

5. The system of claim 4, wherein the prediction dictionary protocol includes a topic domain prediction dictionary protocol and a relationship prediction dictionary protocol.

6. The system of claim 4, wherein calculating the one or more first frequency values comprises:

generating the one or more first frequency values through counting occurrence of each of the one or more indivisible individual units in the input content.

7. A method to select an input protocol based on an input content, the method comprising:
analyzing the input content that includes at least one of plain language text, punctuation, symbols, or emoticons;
extracting one or more indivisible individual units from the input content;
calculating one or more first frequency values of occurrence of the one or more indivisible individual units in the input content, each indivisible individual unit associated with a corresponding first frequency value included in the one or more first frequency values of occurrence;
calculating one or more similarity values between the input content and one or more profiles stored in a database based on a vector space model, wherein the vector space model is configured to output a corresponding similarity value between the input content and a corresponding profile as a histogram intersection between the one or more first frequency values of occurrence of the one or more indivisible individual units in the input content and one or more second frequency values of occurrence of the one or more indivisible individual units in the corresponding profile, each indivisible individual unit associated with a corresponding second frequency value included in the one or more second frequency values of occurrence;
ranking the one or more similarity values;
identifying a first ranked input protocol associated with a highest similarity value based on the one or more similarity values; and
selecting the first ranked input protocol associated with the highest similarity value,
wherein:
the first ranked input protocol is selected from a plurality of input protocols;
the first ranked input protocol includes a generating protocol and a prediction dictionary protocol;
the generating protocol includes a natural language generating protocol, a symbol generating protocol, and an emoticon generating protocol; and
each of the plurality of input protocols includes a generating protocol with a different natural language generating protocol, symbol generating protocol, and emoticon generating protocol than generating protocols of others of the plurality of input protocols.

8. The method of claim 7, wherein the database includes the one or more indivisible individual units.

9. The method of claim 8, wherein:
the one or more second frequency values of occurrence of the one or more indivisible individual units are predetermined in the corresponding profile; and
the histogram intersection between the one or more first frequency values related to the input content and the one or more second frequency values in the corresponding profile includes a summation of one or more frequency minimums divided by a sum of the one or more second frequency values, each frequency minimum being a minimum of a corresponding first frequency value and a corresponding second frequency value.

10. The method of claim 7, wherein the prediction dictionary protocol includes a prediction dictionary database and a processing module.

11. The method of claim 7, wherein the corresponding profile is assigned with one or more properties and wherein the one or more properties include relationship with a generating protocol and relationship with a prediction dictionary protocol.

12. The method of claim 11, wherein the relationship with a generating protocol includes a natural language generating protocol type, a symbol generating protocol type and an emoticon generating protocol type.

13. The method of claim 7, wherein calculating the one or more first frequency values further comprises:
generating the one or more first frequency values through counting occurrence of each of the one or more indivisible individual units in the input content.

14. A system to select an input protocol based on an input content, the system comprising:
a processor; and
a non-transitory computer-readable medium that includes computer-readable instructions stored thereon that are executable by the processor to perform or control performance of operations comprising:
analyzing the input content that includes at least one of plain language text, punctuation, symbols, or emoticons;
extracting one or more indivisible individual units from the input content;
calculating one or more first frequency values of occurrence of the one or more indivisible individual units in the input content, each indivisible individual unit associated with a corresponding first frequency value included in the one or more first frequency values of occurrence;
calculating one or more similarity values between the input content and one or more profiles stored in a database based on a vector space model, wherein the vector space model is configured to output a corresponding similarity value between the input content and a corresponding profile as a histogram intersection between the one or more first frequency values of occurrence of the one or more indivisible individual units in the input content and one or more second frequency values of occurrence of the one or more indivisible individual units in the corresponding profile, each indivisible individual unit associated with a corresponding second frequency value included in the one or more second frequency values of occurrence;
ranking the one or more similarity values;
identifying a first ranked input protocol associated with a highest similarity value based on the one or more similarity values; and
selecting the first ranked input protocol associated with the highest similarity value,
wherein:
the first ranked input protocol is selected from a plurality of input protocols;
the first ranked input protocol includes a generating protocol and a prediction dictionary protocol;
the generating protocol includes a natural language generating protocol, a symbol generating protocol, and an emoticon generating protocol; and
each of the plurality of input protocols includes a generating protocol with a different natural language generating protocol, symbol generating protocol, and emoticon generating protocol than generating protocols of others of the plurality of input protocols.

15. The system of claim 14, wherein the database includes the one or more indivisible individual units.

16. The system of claim 14, wherein:
calculating the one or more first frequency values comprises generating the one or more first frequency values through counting occurrence of each of the one or more indivisible individual units in the input content;
the one or more second frequency values are predetermined in the corresponding profile; and
the histogram intersection between the one or more first frequency values related to the input content and the one or more second frequency values in the corresponding profile includes a summation of one or more frequency minimums divided by a sum of the one or more second frequency values, each frequency minimum being a minimum of a corresponding first frequency value and a corresponding second frequency value.

17. The system of claim 14, wherein the prediction dictionary protocol includes a prediction dictionary database and a processing module.

18. The system of claim 14, wherein the corresponding profile is assigned with one or more properties and wherein the one or more properties include relationship with a generating protocol and relationship with a prediction dictionary protocol.

19. The system of claim 18, wherein the relationship with the generating protocol includes a natural language generating protocol type, a symbol generating protocol type and an emoticon generating protocol type.

* * * * *